Oct. 5, 1926.                                                1,602,064
W. O. ASHE
WATER GAUGE
Filed July 13, 1922

William Oliver Ashe
Inventor
H. Phillis
By his Attorney

Patented Oct. 5, 1926.

1,602,064

UNITED STATES PATENT OFFICE.

WILLIAM OLIVER ASHE, OF NEW YORK, N. Y., ASSIGNOR TO NATHAN MANUFACTURING COMPANY, OF NEW YORK, N. Y.

WATER GAUGE.

Application filed July 13, 1922. Serial No. 574,862.

The invention herein described and claimed relates to water gauges of the types commonly used on steam locomotives and has for its objects a unitary structure containing a water gauge and source of illumination, such as an electric light lamp, for the purpose of reading the water gauge at night. Advantages of my invention are economy of manufacture, convenience of attachment, saving in space and excellent visibility of the readings on the gauge, other characteristic advantages appearing from the drawings and following description.

Figure 1:
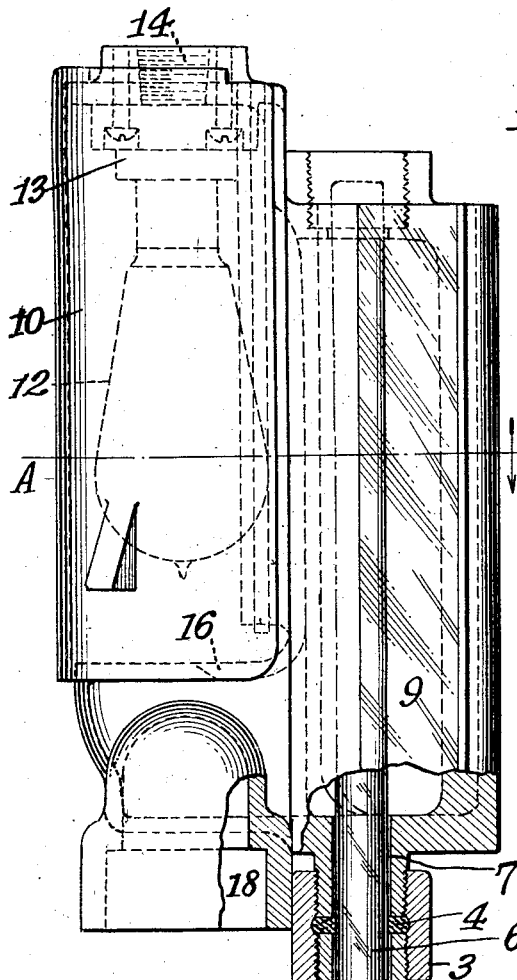
Figure 2:
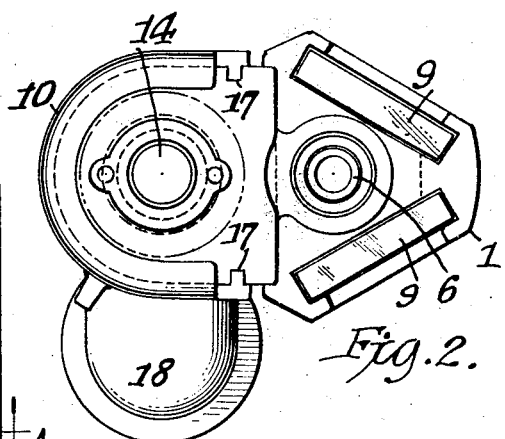
Figure 3:
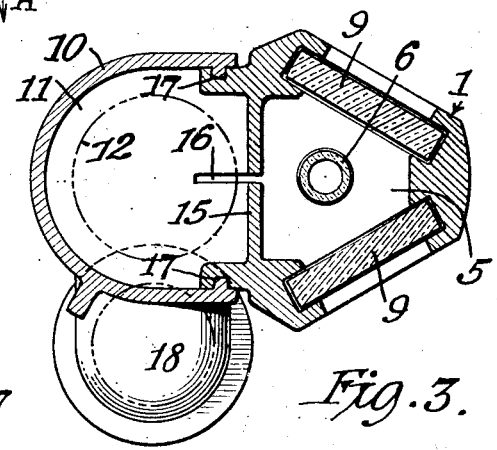

Fig. 1 is a vertical elevation. Fig. 2 is a top view. Fig. 3 is a sectional view on the line A—A of Fig. 1.

Referring to the drawings: 1 is the casing of the water gauge being connected to a conventional lower water gauge valve 2 by nut 3 and packing 4. In chamber 5 is water gauge 6 having internal passageway 7 leading to valve 2 and to port 8, which latter connects with a lead to the boiler, not shown. Casing 1 contains one or more windows 9, 9 preferably composed of heavy reinforced glass through which the water gauge may be observed.

Sleeve 10 incloses chamber 11 in which is electric light lamp 12 in socket 13 suitably wired through port 14. Dividing wall 15 separates this chamber and lamp from chamber 5 and water gauge 6. The slot 16 in dividing wall 15 allows light to pass from the electric light lamp to chamber 5 and to the water gauge. Sleeve 10 is shown as slidable in slots 17, 17 of casing 1. A passage 18 from water gauge chamber 5 may conveniently permit of the escape of broken glass and steam in the event of the water gauge being broken.

It is obvious from the foregoing that many variations may be made from the details and arrangement of the particular form of my invention herein illustrated and described without departing from the spirit and scope of my invention.

I claim:

1. In a water gauge construction, a gauge glass, a housing for the gauge glass having transparent walls through which the gauge glass may be observed and a wall formed of opaque material, a lamp chamber mounted exteriorly of said housing and having the opaque wall of the housing for one of its side walls, and said opaque wall being provided with a narrow light-emitting slit, said narrow slit functioning to direct a narrow beam of light along the gauge glass and to confine the width of the area of illumination between the sides of the gauge glass.

2. In a water gauge construction, a vertically disposed gauge glass, a housing for the gauge glass having a triangular cross section with two adjacent sides formed to provide transparent window sections, the third side of the housing being formed of opaque material, a lamp casing removably mounted on said housing on the opaque wall thereof, said opaque wall being provided with a narrow light-emitting slit, said narrow slit functioning to direct a narrow beam of light along the gauge glass and to confine the width of the area of illumination between the sides of the gauge glass, and said housing for the gauge glass being provided with a discharge passage beneath and to one side of said lamp casing.

3. In a water gauge construction, a vertically disposed gauge glass, a housing for the gauge glass having a triangular cross section with two adjacent sides formed with vertical grooves, transparent window members adapted to be received in said grooves, the third side of the housing being formed of opaque material, the opaque wall member being provided with vertical slideways, a lamp casing adapted to removably engage said slideways, a rearward projection on the lower portion of said opaque wall on which said lamp casing may rest, a passageway leading from said gauge glass housing through said rearward projection, said opaque wall being provided with a narrow slit through which a narrow beam of light is directed against said gauge glass, and the space separating the slit and the gauge glass being less than the diameter of the glass whereby the light beam will be confined between the sides of the glass.

WILLIAM OLIVER ASHE.